March 16, 1965 R. L. VAN ANTWERP 3,173,692

PHONOGRAPH TONE ARM

Filed Feb. 19, 1962

INVENTOR.
Robert L. Van Antwerp,
BY Brown, Jackson,
Boettcher & Dienner
attys

United States Patent Office 3,173,692
Patented Mar. 16, 1965

3,173,692
PHONOGRAPH TONE ARM

Robert L. Van Antwerp, Benton Harbor, Mich., assignor to V-M Corporation, Benton Harbor, Mich., a corporation of Michigan Filed Feb. 19, 1962, Ser. No. 174,114
12 Claims. (Cl. 274—23)

The present invention relates to a phonograph tone arm embodying improved cartridge mounting structure for mounting a cartridge in a vertically compliant manner.

It has been found to be desirable to provide a phonograph in which the pressure exerted by the needle or stylus on the surface of a record is quite small, for example, on the order of about three grams. In order to effect such light needle pressures, the phonograph tone arm is balanced about its pivotable support so that the outer end or head thereof will exert the desired downward force. However, when such light needle pressures are employed, difficulties have been encountered in providing a tone arm assembly wherein the needle will accurately track in the groove of a record at a relatively constant pressure. In other words, a typical phonograph record is warped to some extent, resulting in the transmission of shocks from the record to the needle and cartridge assembly mounted in the tone arm, thus causing a variation of the needle pressure and consequent inaccurate tracking of the needle in a record groove.

Numerous attempts have heretofore been made to alleviate the foregoing problems by providing a vertically compliant cartridge, that is, one which is adapted to move vertically relative to the tone arm. Where a cartridge or pick-up assembly is adapted to move up and down in accordance with changes in the level of a record being reproduced, without transmitting such movement directly to the tone arm, it is possible to obtain more constant needle pressure and more accurate tracking of the needle in a record groove, while permitting the use of unusually light needle pressure. Another advantage of a vertically compliant cartridge is that the stylus will retract upwardly into the tone arm if a downward force is accidentally applied to the arm, thus protecting the stylus and a record being reproduced thereby from being damaged.

The principal disadvantages of known forms of vertically compliant cartridges relate to the difficulty and expense of manufacture and assembly, and the critical nature of the adjustments necessary to condition the cartridge for proper operation. In addition to the foregoing, one of the most serious problems encountered has been to provide cartridge mounting mechanism which permits a cartridge to move freely in a verticaly direction without having to overcome a significant amount of frictional resistance. In other words, where a cartridge is pivotally mounted, friction at the pivot will reduce the compliancy of the cartridge and impair its effectiveness.

It is an object of the present invention to provide a tone arm embodying improved cartridge mounting mechanism which permits vertical movement of a cartridge relative to the tone arm with a minimum of frictoin therebetween.

Another object of the invention is to provide cartridge mounting mechanism of the character mentioned above which is simple and inexpensive to manufacture, and which can be assembled in the head of a phonograph tone arm and adjusted for proper operation with unusual facility.

Other objects, uses and advantages of the invention will become apparent, or be obvious, from the following specification, particularly when considered in connection with the drawings in which.

Figures 1, 2, 3, 4:
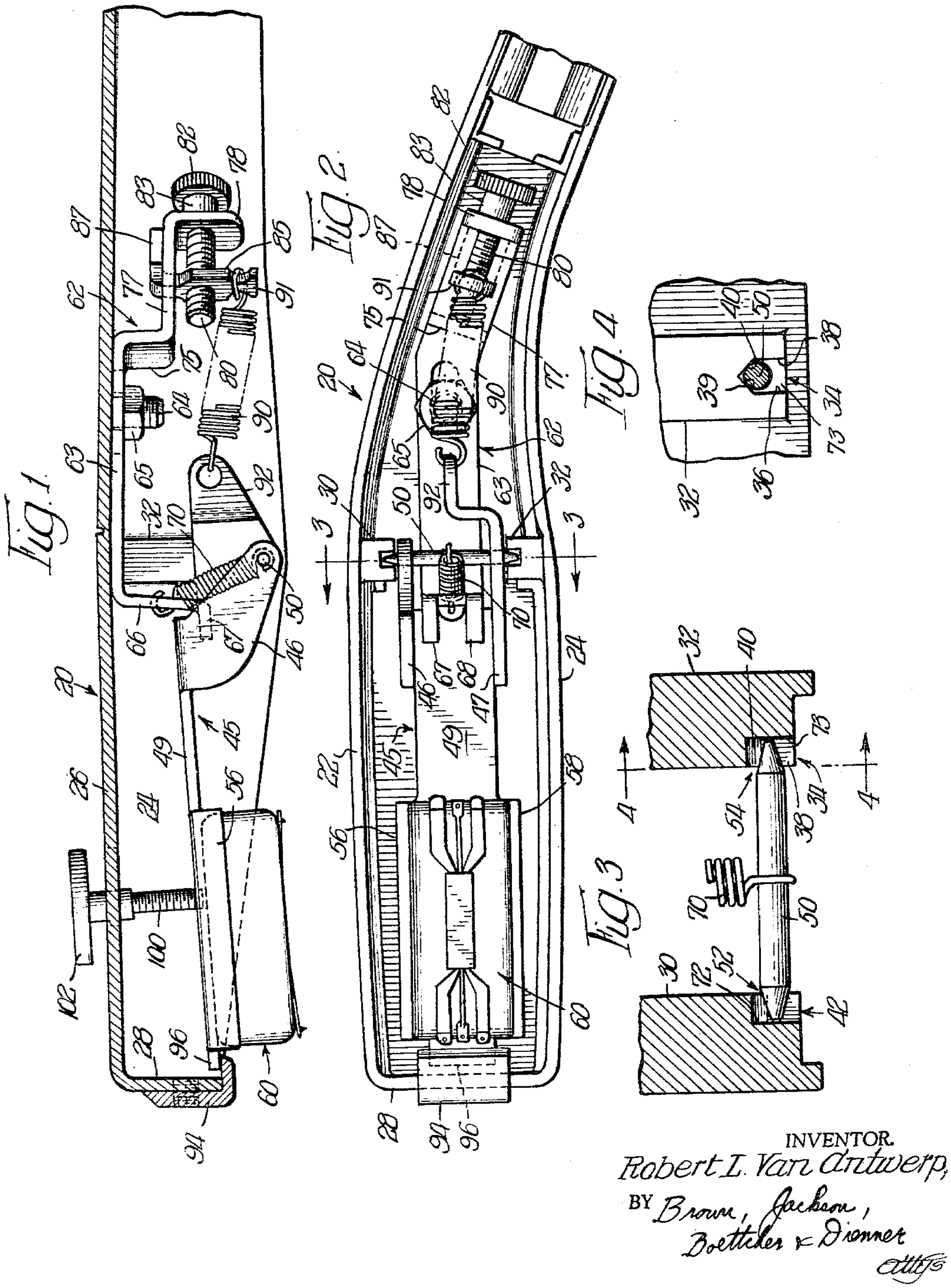
FIGURE 1 is a side elevational view of a cartridge mounting mechanism embodying the present invention, the mechanism being shown incorporated in a phonograph tone arm which appears in section and partly broken away.
FIGURE 2 is a bottom plan view of the tone arm assembly of FIGURE 1.
FIGURE 3 is an enlarged sectional view, taken along the line 3—3 of FIGURE 2, showing the manner in which a pivot pin is positioned in seats formed on the tone arm and held therein by a tension spring, other parts being removed for purposes of clarity.
FIGURE 4 is a sectional view taken along the line 4—4 of FIGURE 3.

Referring now to the drawings, there is shown a fragmentary portion of a tone arm housing 20 comprising opposed side walls 22 and 24, a top wall 26, and an outer end wall 28. A pair of oppositely disposed projecting portions or bosses 30 and 32 are cast or otherwise formed integral with the inner surfaces of the side walls 22 and 24, respectively. The boss 30 is substantially vertical and extends along the inner side of the wall 22 approximately from the top wall 26 to the lower edge of the side wall 22. The boss 32 is in opposed relation to the boss 30 and extends along the inner side of the wall 24 approximately from the top wall 26 to the lower edge of the wall 24. At the bottom of the boss 32 there is formed a recess or seat 34 (see FIGURE 4) including parallel side wals 36 and 38 and an inverted V-shaped base portion comprising converging walls 39 and 40 which are each inclined from the vertical at an angle of approximately 45 degrees. The bottom of the opposed boss 30 is provided with a substanitally identical recess 42.

A cartridge mounting bracket, indicated generally at 45, comprises a pair of arms 46 and 47 which extend rearwardly and downwardly from opposite sides of a flat base portion 49, the arms being provided with aligned holes for receiving a horizontal pivot pin 50. The pin 50 is locked in place relative to the arms 46 and 47 by staking the sides of the arms, or by other suitable means, and the assembly is positioned so that the ends of the pin are received in the opposed recessed seats 34 and 42, respectively.

The end portions of the pin 50 are preferably frustoconical, as shown at 52 and 54 in FIGURE 3, whereby each pin end will be seated in a corresponding one of the inverted V-shaped bases of the seats 34 and 42 so as to be supported on two bearing points, rather than along a pair of lines as in the case of a straight pin. In this manner, it is possible to minimize the friction at the pin bearings.

The flat base portion 49 of the cartridge mounting bracket 45 extends forwardly so as to terminate proximate the tone arm end wall 28, and said portion 49 is provided at its opposite sides with a pair of downwardly depending side walls 56 and 58 for mounting a cartridge assembly 60. The cartridge 60 is disposed between the walls 56 and 58 so as to bear against the underside of the flat portion 49, and cartridge is secured to said flat portion by screw fasteners or other suitable means.

A slide bracket, indicated generally at 62, comprises a flat base portion 63 which is affixed to the underside of the tone arm top wall 26 by a threaded stud 64 which projects downwardly from the wall 26 through an opening therefor in the base 63, a nut 65 being threaded on the stud to secure the bracket 62 in position. The bracket 62 extends forwardly along the underside of the wall 26 and is then bent downwardly to form a generally vertical portion 66. At the lower end of the vertical portion 66, a pair of bifurcated arms 67 and 68 are bent forwardly so as to extend underneath the cartridge bracket base plate 49.

A tension spring 70 has one end which extends through a hole in the vertical bracket portion 66 so as to be anchored thereto, and its other end wrapped about the axially central portion of the pivot pin 50. In this manner, the spring 70 maintains the pin 50 seated in the inverted V-shaped bases of the tone arm seats 34 and 42, whereby the pin may rotate in said seats but is prevented from moving linearly in a transverse plane. In addition, with reference to FIGURE 3, while some clearance is provided between the ends of the pin 50 and opposed sides 72 and 73 of the respective seat portions in order to permit ready insertion of the pin therein, each of the frusto-conical pin ends will bear against the inner edges of a corresponding seat at two bearing points in such a manner as to provide lateral or axial stability for the pin.

Referring now to the rear portion of the slide bracket 62, said bracket is bent downwardly at 75 and then rearwardly again to provide a horizontal portion 77, the rear end of the latter being bent downwardly again to provide a vertical arm 78 which is apertured to receive a horizontally disposed thumb adjusting screw 80. The aperture in the arm 78 is somewhat larger than the outer diameter of the screw 80 so as to permit the latter to be inserted therethrough. The screw 80 is provided with a knurled knob 82 at its rear end, and with an enlarged diameter neck 83 adjacent thereto, the neck 83 being larger than the aperture in the arm 78 so as to limit the extent to which the screw may project forwardly therethrough.

A slide tab 85 is threaded on the screw 80 and extends upwardly through a longitudinal slot (not shown) in the bracket portion 77, the tab then being bent rearwardly so as to provide a guide arm 87 which is adapted to slide along the upper surface of the plate 77. One end of a tension spring 90 is wrapped about a lower end 91 on the slide tab so as to be anchored thereto, and the other end of the spring is secured to an arm 92 which is integral with the arm 47 of the cartridge mounting bracket 45, the arm 92 being offset from the arm 47 so as to be positioned approximately midway between the tone arm side walls 22 and 24.

It will be understood from the foregoing that the tension spring 90 will exert a clockwise torque about the pivot pin 50 (as viewed in FIGURE 1) so as to determine the pivotal position of the cartridge bracket 45, and accordingly the vertical position of the cartridge 60. The desired vertical position of the cartridge 60 can be adjusted by rotation of the thumb adjusting screw 80 so as to cause the slide tab 85 to move forwardly or rearwardly to vary the tension in the spring 90. The cartridge 60 will, of course, be free to move vertically during reproduction of a record, since the bracket 45 is mounted on the pin 50 which is free to pivot in the seats 34 and 42. Thus, the foregoing reference to the desired position of the cartridge will be understood to refer to a desired range of vertical travel.

A stop 94 is screwed or otherwise secured to the outer side of the tone arm end wall 28 and extends rearwardly thereunder so as to be adapted to engage a lug 96 which projects forwardly from the end of the cartridge bracket 45. The stop 94 thus limits the downward travel of the cartridge 60 when the tone arm is lifted from a record. The upper limit of travel for the cartridge 60 is reached when the rear edge of the cartridge bracket base 49 abuts against the vertical portion 66 of the slide bracket 62. A post 100 having a knob 102 thereon is mounted at the top of the base 49 so as to project upwardly through an opening in the upper tone arm wall 26. The post thus serves to provide an indication of the relative movement between the cartridge and the tone arm.

While a certain preferred form of my invention has been described and illustrated, it will be appreciated that modifications and changes may be made therein by those skilled in the art, particularly with my disclosure before them, and thus I do not intend to be limited to the particular disclosure, except insofar as the appended claims are so limited.

I claim:

1. A phonograph tone arm adapted to mount a cartridge in a vertically compliant manner, comprising, in combination, a tone arm housing having a pair of opposed side walls, oppositely disposed projecting portions fixed relative to the inner surfaces of said side walls, respectively, each of said projecting portions having a recess formed therein so as to open generally downwardly, a horizontal pivot pin positioned with its opposite ends seated in said recesses, a tension spring having one end anchored with respect to said tone arm housing and its other end secured to said pin to bias the same generally upwardly into a seated position in said recesses, and a cartridge mounting bracket supported on said pin for pivotal movement about the axis thereof, said bracket having a forward end portion adapted to mount a cartridge whereby said bracket end portion and a cartridge mounted thereon are adapted to pivot about the axis of said pin and thus move substantially vertically relative to said tone arm.

2. A phonograph tone arm adapted to mount a cartridge in a vertically compliant manner, comprising, in combination, a tone arm housing having a pair of opposed side walls, oppositely disposed projecting portions fixed relative to the inner surfaces of said side walls, respectively, each of said projecting portions having a recess formed therein so as to open generally downwardly, a horizontal pivot pin positioned with its opposite ends seated in said recesses, a first tension spring having one end anchored with respect to said tone arm housing and its other end secured to said pin to bias the same generally upwardly into a seated position in said recesses, a cartridge mounting bracket supported on said pin for pivotal movement about the axis thereof, said bracket having a forward end portion adapted to mount a cartridge whereby said bracket end portion and a cartridge mounted thereon are adapted to pivot about the axis of said pin and thus move substantially vertically relative to said tone arm, and a second tension spring having one end secured to said bracket at a point above the axis of said pin and extending rearwardly therefrom with its other end secured to adjustable means for varying the tension therein.

3. The invention of claim 2 wherein said adjustable means comprises a supporting bracket, a slide tab having a portion which projects upwardly through a slot in said bracket and then extends horizontally so as to be adapted to slide along said bracket, and a downwardly projecting portion having a threaded opening therein, said other end of said second tension spring being secured to said downwardly projecting portion, and a horizontally disposed thumb screw having one end projecting through an opening in said bracket and its other end engaged in said threaded opening.

4. A phonograph tone arm adapted to mount a cartridge in a vertically compliant manner, comprising, in combination, a tone arm housing having a pair of opposed side walls, oppositely disposed projecting portions fixed relative to the inner surfaces of said side walls, respectively, each of said projecting portions having a recess formed therein so as to open generally downwardly, a horizontal pivot pin positioned with its opposite ends seated in said recesses, a tension spring having one end anchored with respect to said tone arm housing and its other end secured to said pin to bias the same generally upwardly into a seated position in said recess, a cartridge mounting bracket supported on said pin, said bracket being fixed relative to said pin for pivotal movement therewith, and said bracket having a forward end portion adapted to mount a cartridge whereby said bracket end portion and a cartridge mounted thereon are adapted to pivot about the axis of said pin and thus move substantially vertically relative to said tone arm.

5. A phonograph tone arm adapted to mount a cartridge in a vertically compliant manner, comprising, in combination, a tone arm housing having a pair of opposed side walls, oppositely disposed projecting portions fixed relative to the inner surfaces of said side walls, respectively, each of said projecting portions having an inverted V-shaped recess formed therein so as to open generally downwardly, a horizontal pivot pin positioned with its opposite ends seated in said recesses, a first tension spring having one end anchored with respect to said tone arm housing and its other end secured to said pin to bias the same generally upwardly into a seated position in said recesses, a cartridge mounting bracket supported on said pin, said bracket being fixed relative to said pin for pivotal movement therewith and having a forward end portion adapted to mount a cartridge, whereby said bracket end portion and a cartridge mounted thereon are adapted to pivot about the axis of said pin and thus move substantially vertically relative to said tone arm, and a second tension spring having one end secured to said bracket at a point above the axis of said pin and extending rearwardly therefrom with its other end secured to adjustable means for varying the tension in said second spring.

6. The invention of claim 5 wherein said pin ends comprise frusto-conical portions which are seated in said V-shaped recesses, respectively.

7. A phonograph tone arm adapted to mount a cartridge in a vertically compliant manner, comprising, in combination, a tone arm housing having a pair of opposed side walls, oppositely disposed projecting portions integral with the inner surfaces of said side walls, respectively, each of said projecting portions having an inverted V-shaped recess formed therein so as to open generally downwardly, a horizontal pivot pin having frusto-conical end portions seated in said recesses, a tension spring having one end anchored with respect to said tone arm housing and its other end secured to said pin to bias the same generally upwardly into a seated position in said recesses, and a cartridge mounting bracket supported on said pin, said bracket being fixed relative to said pin for pivotal movement therewith, and said bracket having a forward end portion adapted to mount a cartridge whereby said bracket end portion and a cartridge mounted thereon are adapted to pivot about the axis of said pin and thus move substantially vertically relative to said tone arm.

8. A phonograph tone arm adapted to mount a cartridge in a verticaly compliant manner, comprising, in combinaation, a tone arm housing having a pair of opposed side walls, oppositely disposed projecting portions integral with the inner surfaces of said side walls, respectively, each of said projecting portions having an inverted V-shaped recess formed therein so as to open generally downwardly, a horizontal pivot pin positioned with its opposite ends seated in said recesses, a slide bracket fixed to the underside of said tone arm and having a forward portion and a rearward portion, a first tension spring having one end anchored to said forward portion and its other end secured to said pin to bias the same generally upwardly into a seated position in said recess, a cartridge mounting bracket supported on said pin, said bracket being fixed relative to said pin for pivotal movement therewith and having a forward end portion adapted to mount a cartridge, whereby said cartridge bracket end portion and a cartridge mounted thereon are adapted to pivot about the axis of said pin and thus move substantially vertically relative to said tone arm, a second tension spring having one end secured to said cartridge bracket at a point above the axis of said pin and extending rearwardly therefrom with its other end secured to a slide tab slidably mounted on the rearward portion of said slide bracket, and thumb screw adjusting means engaged with said slide tab for varying the tension in said second tension spring.

9. The invention of claim 8 wherein said pin is provided with frusto-conical end portions which are seated in said V-shaped recesses, respectively.

10. A phonograph tone arm adapted to mount a cartridge in a vertically compliant manner, comprising, in combination, a tone arm housing having a pair of opposed side walls, a pair of oppositely disposed bosses, each boss being formed integral with the inner surface of a corresponding one of said side walls, a recess formed in the underside of each of said bosses so as to open downwardly and also communicate with the space between said two bosses, a horizontal pivot pin positioned with its opposite ends seated in said recesses, a tension spring having one end fixed relative to said tone arm housing and its other end secured to said pin intermediate the ends thereof so as to bias said pin generally upwardly into a seated position in said recesses, and a cartridge mounting bracket supported on said pin for pivotal movement about the axis thereof, said bracket having a forward end portion adapted to mount a cartridge, whereby said bracket end portion and a cartridge mounted thereon are adapted to pivot about the axis of said pin and thus move substantially vertically relative to said tone arm.

11. A phonograph tone arm adapted to mount a cartridge in a vertically compliant manner, comprising, in combination, a tone arm housing having a pair of opposed side walls, a pair of oppositely disposed bosses, each boss being formed integral with the inner surface of a corresponding one of said side walls, a recess formed in the underside of each of said bosses so as to open downwardly and also communicate with the space between said two bosses, a horizontal pivot pin positioned with its opposite ends seated in said recesses, a first tension spring having one end fixed relative to said tone arm housing and its other end secured to said pin intermediate the ends thereof, said first spring extending upwardly and forwardly from said pin so as to bias the latter upwardly and forwardly into a seated position in said recesses, a cartridge mounting bracket supported on said pin for pivotal movement about the axis thereof, said bracket having a forward end portion adapted to mount a cartridge whereby said bracket end portion and a cartridge mounted thereon are adapted to pivot about the axis of said pin and thus move substantially vertically relative to said tone arm, and a second tension spring having one end secured to said bracket at a point above the axis of said pin and extending rearwardly therefrom with its other end fixed relative to said tone arm housing, said first and second springs thus exerting opposed horizontal force components upon said pivot pin.

12. A phonograph tone arm adapted to mount a cartridge in a vertically compliant manner, comprising, in combination, a tone arm housing having a pair of opposed side walls, a pair of oppositely disposed bosses, each boss being formed integral with the inner surface of a corresponding one of said side walls, a pair of inverted V-shaped recesses one formed in the underside of said bosses so as to open downwardly and also communicate with the space between said two bosses, a horizontal pivot pin having frusto-conical end portions seated in said recesses, a first tension spring having one end fixed relative to said tone arm housing and its other end secured to said pin intermediate the ends thereof, said first spring extending upwardly and forwardly from said pin so as to bias the latter upwardly and forwardly into a seated position in said recesses, a cartridge mounting bracket supported on said pin, said bracket being fixed relative to said pin for pivotal movement therewith, and said bracket having a forward end portion adapted to mount a cartridge whereby said bracket end portion and a cartridge mounted thereon are adapted to pivot about the axis of said pin and thus move substantially vertically relative to said tone arm, and a second tension spring having one end secured to said bracket at a point above the axis of said pin and extending rearwardly therefrom with its other end fixed relative to said tone arm housing, said first and second springs thus exerting opposed horizontal force components upon said pivot pin.

References Cited in the file of this patent

UNITED STATES PATENTS

| | | |
|---|---|---|
| 2,357,033 | Thompson | Aug. 19, 1944 |
| 2,660,437 | Harmon | Nov. 24, 1953 |
| 3,044,783 | Doncaster | July 17, 1962 |

FOREIGN PATENTS

| | | |
|---|---|---|
| 574,435 | Great Britain | Jan. 4, 1946 |